United States Patent Office 3,077,471
Patented Feb. 12, 1963

3,077,471
STEROIDS OF THE 19-NORPREGNANE SERIES
Josef Fried, Princeton, and Mariano A. Guiducci, Edison, N.J., assignors to Olin Mathieson Chemical Corporation, New York, N.Y., a corporation of Virginia
No Drawing. Filed Aug. 4, 1961, Ser. No. 129,233
13 Claims. (Cl. 260—239.55)

This invention relates to, and has for its objects the provisions of new physiologically active steroids, methods for preparing the same, and intermediates useful in such preparations.

The final products of this invention are steroids which are 16,17-acetal and ketal derivatives of 16α,17α-dihydroxy-19-nor-3alkoxy-1,3,5(10)-pregnatriene steroids, and include steroids of the general Formula I (I)
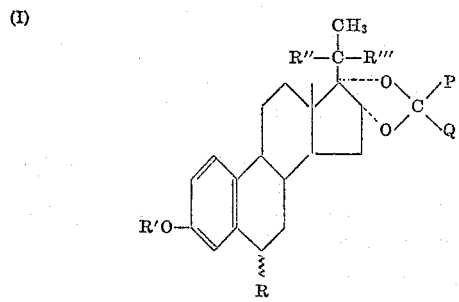

wherein R is in either the alpha or beta position and represents hydrogen or lower alkyl; R' is hydrogen or lower alkyl (preferably methy); R" is hydroxy or acyloxy (preferably the acyloxy radical of a hydrocarbon carboxylic acid of less than ten carbon atoms); R''' is hydrogen; or together R" and R''' is oxo (O=); P is hydrogen, lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; Q is lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; or together with the carbon to which they are joined P and Q is a monocyclic cycloalkyl or monocyclic heterocyclic radical.

The final products of this invention are physiologically-active substances which possess estrongenic activitiy when administered both in the form of tablets and as a solution or suspension and hence can be used in lieu of known estrogenic agents, such as estrone or estradiol benzoate in the treatment of menopausal symptoms. For this purpose, they can be administered in the same manner as estrone or estadiol benzoate, for example, the dosage being adjusted for the relative potency of the particular steroid.

Those compounds of this invention wherein P is hydrogen, lower alkyl, halo lower alkyl, monocyclic cycloalkyl, or monocyclic cycloalkyl lower alkyl, Q is lower alkyl, halo lower alkyl, monocyclic cycloalkyl or monocyclic cycloalkyl lower alkyl, or together with the carbon to which they are joined P and Q is monocyclic cycloalkyl, are also useful as intermediates in the preparation 19-nor-16α,17α - dihydroxyprogesterone, 19-nor-5(10)-pregnene-16α,17α-diol-3,20-dione, or acetal or ketal derivatives thereof, as more fully described in our application, Serial No. 129,234, filed on even date herewith.

The compounds of this invention can be prepared by pyrolyzing a compound of the Formula II (II)
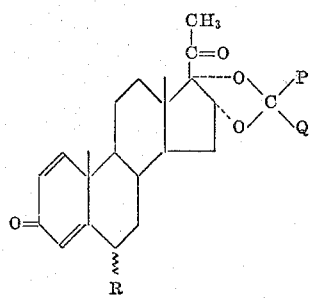

wherein R (in either the alpha or beta position), P and Q are as hereinbefore defined.

The pyrolysis is preferably conducted by heating the steroid reactant to a temperature above about 400° C., preferably about 500° C. to about 700° C., and results in the preparation of the 3-hydroxy-20-keto final products of this invention of the Formula III (III)
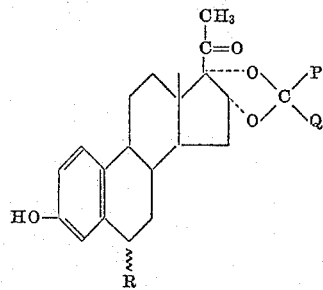

wherein R, P and Q are as hereinbefore defined.

The 3-hydroxy-20-keto products can then be etherified by treatment with a lower alkyl halide or sulfate (e.g., dimethyl sulfate, diethyl sulfate, propyl chloride, n-butyl chloride, and n-hexyl chloride), in the presence of a base, such as potassium hydroxide, to yield the corresponding 3-ether derivatives of the Formula IV (IV)
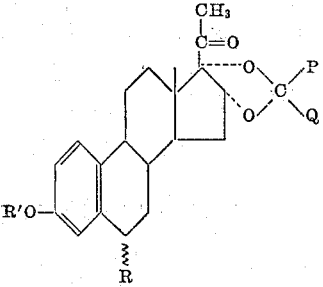

wherein R, R', P. and Q are as hereinbefore defined, which are new compounds of this invention.

The resulting 3-ether-20-keto steroids can then be reduced, as by treatment with lithium aluminum hydride or sodium borohydride to yield the corresponding 20β-hydroxy derivatives of the Formula V (V)
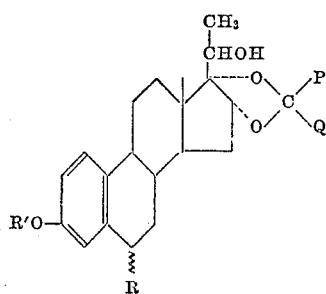

wherein R, R', P and Q are as hereinbefore defined, which are also new compounds of this invention; and these 20β-hydroxy compounds can then be esterified in the usual manner by treatment with an acid anhydride or acyl halide, preferably in the presence of a basic catalyst, such as pyridine, to yield products of this invention of the Formula VI (VI)
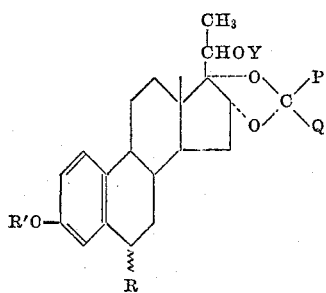

wherein R, R', P and Q are as hereinbefore defined and Y is an acyl radical, preferably the acyl radical of a hydrocarbon carboxylic acid of less than ten carbon atoms, as exemplified by the lower alkanoic acids (e.g., acetic, propionic, butyric and enanthic acid), lower alkenoic acids, monocyclic aryl carboxylic acids (e.g., benzoic and m-toluic acid), monocyclic aryl lower alkanoic acids (e.g., phenacetic and β-phenylpropionic acid), monocyclic aryl lower alkenoic acids, cycloalkanecarboxylic acids, and cycloalkenecarboxylic acids.

The 16,17-acetal and ketal derivatives, and especially the acetals and ketals with aromatic aldehydes and ketones, can also be prepared by hydrolyzing compounds of the Formulae III or IV to yield new intermediates of this invention of the Formula VII (VII)
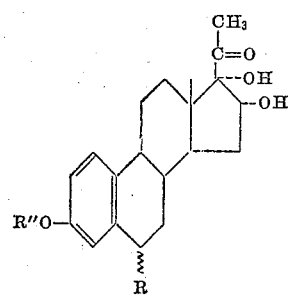

wherein R is as hereinbefore defined and R″ is hydrogen or lower alkyl. This hydrolysis is accomplished by treating the steroid with formic acid. If concentrated aqueous formic acid is used (e.g., 90% formic acid), a 16-formic acid ester or, if R″ is hydrogen, a 3,16-diester is formed initially, which is then hydrolyzed by treatment with 10% aqueous potassium carbonate in methanol to yield the free 16,17-dihydroxy steroid derivative.

These free 16,17-dihydroxy steroids can then be reacted with an aldehyde or ketone of the formula:

wherein P and Q are as hereinbefore defined, to give the final acetal and ketal derivatives of this invention.

In those instances where the starting steroids are new compounds, they can be prepared by reacting a compound of the formula

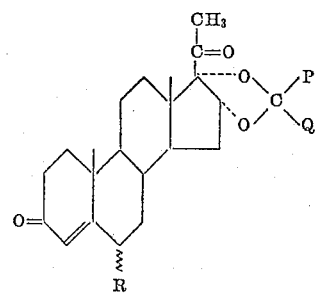

wherein R, P and Q are as hereinbefore defined, with 2,3-dichloro-5,6-dicyanobenzoquinone, whereby a double-bond is introduced between the 1 and 2 positions, thereby yielding the starting steroids of this invention. The reaction is preferably conducted in an organic solvent for the steroid reactant at an elevated temperature, preferably the reflux temperature of the solvent. These steroids may also be prepared by microbiological dehydrogenation using an organism such as *C. simplex* or *B. cyclooxidans*.

If a ketal or acetal grouping other than that present in the starting steroid reactant is desired, the resulting product may be cleaved by treatment with aqueous formic acid to yield 16α,17α-dihydroxy intermediates of the formula

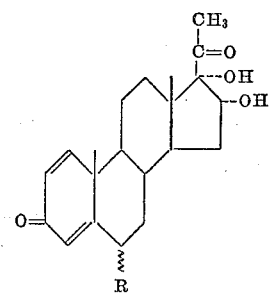

wherein R is as hereinbefore defined. If concentrated aqueous formic acid is used (e.g., 90% formic acid), a 16-formic acid ester is formed, which is then hydrolyzed by treatment with 10% aqueous potassium carbonate in methanol to yield the free 16,17-dihydroxy steroid derivative.

These intermediates are than reacted with an aldehyde or ketone of the formula:

wherein P and Q are as hereinbefore defined. The reaction is preferably carried out by treating a suspension or solution of the dihydroxy steroid in the aldehyde or ketone (or an organic solvent and the aldehyde or ketone, if the aldehyde or ketone is a solid) with an acid catalyst (e.g., perchloric acid, p-toluenesulfonic acid, hydrochloric acid, etc.), neutralizing the acid and recovering the acetal or ketal derivative formed.

Suitable aldehyde and ketone reactants include lower alkanals of at least two carbon atoms, such as paraldehyde, propanal and hexanal; di(lower alkyl)ketones, such as acetone, diethylketone, dibutylketone, methylethylketone, and methylisobutylketone; cycloalkanones, such as cyclobutanone, cyclopetanone, cyclohexanone, suberone, and cyclodexanone; cycloalkyl (lower alkanals), such as cyclopropylcarboxaldehyde, cyclobutylcarboxaldehyde, cyclopentylcarboxaldehyde, cyclohexylcarboxaldehyde, cycloheptylcarboxaldehyde, cyclooctylcarboxaldehyde, cyclopropylacetaldehyde, cyclobutylacetaldehyde, cyclopentylacetaldehyde, cyclohexylacetaldehyde, β-cyclopentylpropionaldehyde, γ-cyclohexylbutyraldehyde, and 3-cyclopropylcaproaldehyde; cycloalkyl(lower alkanones), such as cyclopropyl methyl ketone, cyclobutyl ethyl ketone, cyclopentyl propyl ketone, cyclopentylmethyl methyl ketone, cyclohexylmethyl ethyl ketone, cyclopentylethyl ethyl ketone, cyclopropylpropyl methyl ketone, cyclohexyl n-penyl ketone, cyclohexyl methyl ketone, and cyclooctyl methyl ketone; dicycloalkyl ketones, such as dicyclopropyl ketone, dicyclobutyl ketone, dicyclopentyl ketone, dicyclohexyl ketone, cyclopentyl cyclohexyl ketone, cyclopropylmethyl cyclopropyl ketone, 2-cyclobutylethyl cyclopropyl ketone, 3-cyclopentylmethyl cyclopentyl ketone, 5-cyclohexylhexyl cyclohexyl ketone, di-(cyclopentylmethyl) ketone, cyclohexylmethyl cyclopentyl ketone, and di(4-cyclohexylpentyl) ketone; cycloalkyl monocyclic aromatic ketones, such as cyclopropyl phenyl ketone, cyclohexyl p-chlorophenyl ketone, cyclopentyl o-methoxyphenyl ketone, cyclopentyl o,p-dihydroxyphenyl ketone, cyclohexyl m-tolyl ketone, cyclopropyl p-ethylphenyl ketone, cyclopropyl p-nitrophenyl ketone, and cyclohexyl p-actamidophenyl ketone; cycloalkyl(lower alkyl) monocyclic aromatic ketones, such as cyclopentylmethyl phenyl ketone; cycloalkyl monocyclic aromatic (lower alkyl) ketones, such as cyclopentyl benzyl ketone, cyclohexyl phenethyl ketone, and cyclobutyl benzyl ketone; cycloalkyl(lower alkyl) monocyclic aromatic (lower alkyl) ketones, such as cyclopentylmethyl benzyl ketones; cycloalkyl monocyclic heterocyclic ketones, such as cyclopentyl 2-furyl ketone, cyclohexyl 2-thienyl ketone, and cyclopropyl 2-pyridinyl ketone; cycloalkyl (lower alkyl) monocyclic heterocyclic ketones, such as cyclopentylmethyl 2-piperidinyl ketone, cyclohexylethyl 2-morpholinyl ketone and cyclopropyl 2-thienyl ketone; cycloalkyl monocyclic heterocyclic (lower alkyl) ketones, such as cyclopentyl thenyl ketone, cyclohexyl furfuryl ketone and cyclopropyl 2-piperidinylmethyl ketone; halo-lower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carbocyclic aromatic aldehydes such as benzaldehyde, halobenzaldehydes (e.g., p-chlorobenzaldehyde and p-fluorobenzaldehyde), lower alkoxybenzaldehydes (e.g., o-anisaldehyde), di(lower alkoxy)benzaldehydes (e.g. veratraldehyde), hydroxybenzaldehydes (e.g., salicylaldehyde), dihydroxybenzaldehydes (e.g. resorcyaldehyde), lower alkyl benzaldehydes (e.g. m-tolualdehyde and p-ethylbenzaldehyde), di(lower alkyl)benzaldehydes (e.g. o,p-dimethylbenzaldehyde), nitrobenzaldehydes, acylamidobenzaldehydes (e.g. N-acetylanthranilaldehyde), and cyanobenzaldehydes; monocyclic carboxylic aromatic lower alkanals, such as phenylacetaldehyde, α-phenylpropionaldehyde, β-phenylpropionaldehyde, γ-phenylbutyraldehyde, and aromatically-substituted halo lower alkoxy, hydroxy, lower alkyl, nitro, acylamido and cyano derivatives thereof; monocyclic heterocyclic aldehydes, such as picolinaldehydes, furfural, thiophene carbonals, and halo, lower alkoxy, hydroxy, lower alkyl, nitro, and cyano derivatives thereof; monocyclic heterocyclic lower alkanals; monocyclic carbocyclic aromatic ketones, such as acetophenone, α,α,α-trifluoroacetophenone, propiophenone, butyrophenone, valerophenone, isocaprophenone halophenyl lower alkyl ketones (e.g. p-chloroacetophenone and p-chloropropiophenone), (lower alkoxy) phenyl lower alkyl ketones (e.g. p-anisyl methyl ketone), di(lower alkoxy)phenyl lower alkyl ketones, hydroxy-phenyl lower alkyl ketones, dihydroxyphenyl lower alkyl ketones (e.g. resacetophenone), (lower alkyl)phenyl lower alkyl ketones (e.g. methyl p-tolyl ketone), di(lower alkyl)-phenyl lower alkyl ketones (o,p-xylyl methyl ketone), nitrophenyl lower alkyl ketones (e.g. p-nitroacetophenone), acylamidophenyl lower alkyl ketones (e.g. acetyl anilines), and cyanophenyl lower alkyl ketones; benzophenone, and mono or bis substituted halo, lower alkoxy, hydroxy, lower alkyl, nitro, acylamido and cyano derivatives thereof; monocyclic carbocyclic aromatic lower alkanones, such as 1-phenyl-3-butanone and 1-phenyl-4-pentanone, and aromatically substituted derivatives thereof; monocyclic heterocyclic ketones, such as 2-acetylfuran, 2-benzoylfuran, 2-acetyl-thiophene and alloxan; and monocyclic heterocyclic lower alkanones.

Among the suitable initial steroid reactants may be mentioned the 16,17-acetals and ketals of each of the following steroids with one of the aldehydes or ketones listed hereinbefore: 16α,17α-dihydroxy-1-dehydro-progesterone, and 6-(lower alkyl)-16α,17α-dihydroxy-1-dehydroprogesterones, such as 6α-methyl-16α,17α-dihydroxy-1-dehydroprogesterone, 6β-methyl-16α,17α-dihydroxy-1-dehydroprogesterone and 6α-ethyl-16α,17α-dihydroxy-1-dehydroprogesterone.

The following examples illustrate the preparation of suitable starting steroids useful in the process of this invention (all temperatures being in centigrade):

EXAMPLE A

*1-Dehydro-16α,17α-Dihydroxyprogesterone 16α,17α-Acetonide*

A solution of 12.3 g. of 16α,17α-dihydroxyprogesterone 16α,17α-acetonide and 8.6 g. of 2,3-dichloro-5,6-dicyanobenzoquinone in 100 ml. of anhydrous dioxane is refluxed for 6 hours. The cooled reaction mixture is filtered and washed several times with 5 ml. portions of dioxane. The crude product obtained after evaporating the solvent in vacuo is purified by chromatography on 100 g. of neutral alumina. Elution of the column with benzene (1.5 l.) and chloroform-benzene 1:20 (2 l.) furnishes about 8.86 g. (72% yield) of the pure 1-dehydro derivative. Recrystallization from acetone-hexane furnishes the analytically pure product.

EXAMPLE B

*1-Dehydro-16,17α-Dihydroxyprogesterone 16α,17α-Acetophenonide*

Following exactly the procedure of Example A but substituting 16α,17α-dihydroxyprogesterone acetophenonide for the acetonide, 1-dehydro-16α,17α-dihydroxyprogesterone 16α,17α-acetophenonide is formed. Recrystallization from ether-hexane furnishes the pure product.

EXAMPLE C

*16α,17α-Chloral Derivative of Δ$^{1,4}$-Pregnadiene-16α,17α-Diol-3,20-Dione*

Following the procedure of Example A but substituting an equivalent amount of the 16α,17α-chloral derivative of 16α,17α-dihydroxyprogesterone for the 16α,17α-dihydroxyprogesterone 16,17-acetonide, the 16α,17α-chloral derivative of Δ$^{1,4}$-pregnadiene-16α,17α-diol-3,20-dione is obtained.

EXAMPLE D

*Dicyclopropyl Ketone Derivative of Δ$^{1,4}$-Pregnadiene-16α-17α-Diol-3,20-Dione*

Following the procedure of Example A but substituting an equivalent amount of the 16α,17α-dicyclopropyl ketone derivative of 16α,17α - dihydroxyprogesterone for the 16α,17α-dihydroxyprogesterone 16,17-acetonide, the dicyclopropyl ketone derivative of $\Delta^{1,4}$-pregnadiene-16α,17α-diol-3,20-dione is obtained.

Similarly, the methylisobutyl ketone derivative, the cyclopropyl phenyl ketone derivative, the cyclohexyl methyl ketone derivative, the 1,1,1-trifluoroacetonide derivative, the heptafluorobutanal derivative, the p-chloroacetophenone derivative, the p-nitroacetophenone derivative, the benzaldehyde derivative, the furfural derivative, the benzophenone derivative and the 2-acetylfuran derivative of 16α,17α-dihydroxyprogesterone, yield the methylisobutyl ketone, the cyclopropyl phenyl ketone, the cyclohexyl methyl ketone, the 1,1,1-trifluoroacetonide, the heptafluorobutanal, the p-chloroacetophenone, the p-nitroacetophenone, the benzaldehyde, the furfural, the benzophenone and the 2-acetylfuran derivatives of $\Delta^{1,4}$-pregnadiene-16α,17α-diol-3,20-dione, respectively.

EXAMPLE E

*6α-Methyl-1-Dehydro-16α,17α-Dihydroxyprogesterone 16α,17α-Acetonide*

A solution of 12.5 g. of 6α-methyl-16α,17α-dihydroxyprogesterone 16α,17α-acetonide and 8.7 g. of 2,3-dichloro-5,6-dicyanobenzoquinone in 100 ml. of anhydrous dioxane is refluxed for 10 hours. The cooled reaction mixture is filtered and washed several times with 5 ml. portions of dioxane, and the solvent removed in vacuo. The crude material is then chromatographed as in Example A to yield the 1-dehydro product.

EXAMPLE F

*6β-Methyl-1-Dehydro-16α,17α-Dihydroxyprogesterone 16α,17α-Acetonide*

Following the procedure of Example E but substituting an equivalent amount of 6β-methyl-16α,17α-dihydroxyprogesterone 16,17-acetonide for the 6α-methyl-16α,17α-dihydroxyprogesterone 16,17-acetonide, 6β-methyl-$\Delta^{1,4}$-pregnadiene-16α,17α-diol-3,20-dione 16,17-acetonide is obtained.

EXAMPLE G

*6α-Methyl-$\Delta^{1,4}$-Pregnadiene-16α,17α-Diol-3,20-Dione 16,17-Acetophenonide*

Following the procedure of Example E but substituting an equivalent amount of 6α-methyl-16α,17α-dihydroxyprogesterone 16,17-acetophenonide for the 6α-methyl-16α,17α - dihydroxyprogesterone 16,17 - acetonide, 6α-methyl-$\Delta^{1,4}$-pregnadiene-16α,17α-diol - 3,20 - dione 16,17-acetophenonide is obtained.

EXAMPLE H

*$\Delta^{1,4}$-Pregnadiene-16α,17α-Diol-3,20-Dione*

A solution of 900 mg. of $\Delta^{1,4}$-pregnadiene-16α,17α-diol-3,20-dione 16,17-acetonide in 15 ml. of 90% formic acid is heated at 42° for 22 hours. The solvents are removed in vacuo, the crude residue dissolved in 50 ml. of methanol and treated under nitrogen with stirring with 10 ml. of a 10% oxygen-free solution of potassium carbonate in water. After 13 minutes at room temperature the mixture is neutralized with 1 ml. of glacial acetic acid and the solution concentrated in vacuo after the addition of water. Extraction with chloroform followed by drying over sodium sulfate and evaporation in vacuo furnishes a residue which on recrystallization from 95% ethanol furnishes about 200 mg. of pure $\Delta^{1,4}$-pregnadiene-16α,17α-diol-3,20-dione.

EXAMPLE I

*6α-Methyl-$\Delta^{1,4}$-Pregnadiene-16α,17α-Diol-3,20-Dione*

Following the procedure of Example H, but substituting an equivalent amount of 6α-methyl-$\Delta^{1,4}$-pregnadiene-16α,17α-diol-3,20-dione 16,17-acetonide for the $\Delta^{1,4}$-pregnadiene-16α,17α-diol-3,20-dione 16,17-acetonide, 6α-methyl-$\Delta^{1,4}$-pregnadiene-16α,17α-diol-3,20-dione is obtained.

Similarly, 6α-methyl-$\Delta^{1,4}$-pregnadiene - 16α,17α - diol-3,20-dione 16,17-acetonide yields 6α-methyl-$\Delta^{1,4}$-pregnadiene 16α,17α-diol-3,20-dione.

EXAMPLE J

*$\Delta^{1,4}$-Pregnadiene-16α-17α-Diol-3,20-Dione 16,17-Acetonide*

To a suspension of 500 mg. of $\Delta^{1,4}$-pregnadiene-16α,17α-diol-3,20-dione in 75 ml. of acetone is added 0.05 of 72% perchloric acid and the mixture is agitated at room temperature for three hours. The mixture is then neutralized with dilute sodium bicarbonate and the acetone removed in vacuo. The resulting crystalline suspension is filtered and the crystals washed with water to yield, after recrystallization from acetone, $\Delta^{1,4}$-pregnadiene-16α,17α-diol-3,20-dione 16,17-acetonide, identical to the product obtained in Example A.

Similarly, the 6-(lower alkyl)-$\Delta^{1,4}$-pregnadiene-16α,17α-diol-3,20 diones can be converted to their acetonide derivatives. Moreover, by substituting other aldehydes and ketones for the acetone in Example J, the other acetal and ketal starting steroids of this invention can be prepared.

The following examples illustrate the process of this invention:

EXAMPLE 1

*19-Nor-1,3,5(10)-Pregnatriene-3,16α,17α-Triol-20-One 16α,17α-Acetonide*

A solution of 2 g. of $\Delta^1$-16α,17α-dihydroxyprogesterone 16α,17α-acetonide in 200 ml. of mineral oil, heated to 100° to maintain solution, is dropped through a glass tube 11 mm. in diameter and 30 cm. long, a 17 cm. length of which is filled with glass helices and heated to 640° in an electric furnace. The rate of addition is adjusted to permit refluxing but not flooding. The temperature of the furnace drops by 30 to 40° when the mineral oil solution passes through the tube thus establishing a pyrolysis temperature of 600–610°, which is maintained during the experiment. The effluent solution is diluted with an equal volume of hexane and extracted with 5% alkali. The resulting alkaline extract of crude phenolic compounds is acidified with dilute hydrochloric acid and extracted with chloroform. The chloroform layer is washed with sodium bicarbonate and sodium chloride solutions, dried over sodium sulfate and the solvent removed in vacuo. The crude residue, about 0.9 g., is dissolved in 25 ml. of benzene and chromatographed on 25 g. of neutral alumina. Elution of the column with benzene:ether 4:1 (1.5 l.) provides about 220 mg. (10% yield) of 19-nor-1,3,5(10)-pregnatriene-3,16α,17α-triol - 20 - one 16α,17α-acetonide, M.P. about 190–195°. Recrystallization from acetone-hexane gives the pure compound of the following properties: M.P. about 203–204°; $[\alpha]_D^{23}+102°$ (c., 1.1 in chlf.);

$\lambda_{max}^{Nujol}$ 2 89, 5.85, 6.15 and 6.30μ; $\lambda_{max}^{alc.}$ 281 mμ (ε=2430), shoulder at 286 mμ (ε=2250) minimum at 247 mμ

*Analysis.*—Calcd. for $C_{23}H_{30}O_4$ (370): C, 74.56; H, 8.16. Found: C, 74.54; H, 8.39.

EXAMPLE 2

*19-Nor-1,3,5(10)Pregnatriene-3,16α,17α-Triol-20-One 16α,17α-Acetophenonide*

A solution of 4 g. of the acetophenone derivative of $\Delta^1$-16α,17α-dihydroxyprogesterone in 400 ml. of mineral oil is treated as described in Example 1. To the crude pyrolysis solution is added 400 ml. of hexane, which results in the formation of a precipitate, which is removed by filtration (1.4 g.). The precipitate is dissolved in 50 ml. of benzene and chromatographed on 40 g. of neutral alumina. Elution of the column with benzene:ether 5:1 (1 l.) and 1:1 (2 l.) provides about 250 mg. (6% yield) of the 16α,17α-acetophenone derivative of 19-nor-1,3, 5(10) - pregnatriene - 3,16α,17α-triol-20-one, M.P. about 185–190°. Recrystallization from acetone-hexane furnishes analytically pure material having the following properties: M.P. about 193–195°; $[\alpha]_D^{23}$ +46° (c., 1.0 in chlf.);

$\lambda_{max}^{Nujol}$ 2.92, 5.86, 6.13, 6.29, 13.05 and 14.24μ; $\lambda_{max}^{alc.}$ 280 mμ (ε=2370), shoulder at 285 mμ (ε=1980)

*Analysis.*—Calcd. for $C_{28}H_{32}O_4$ (432): C, 77.75; H, 7.46. Found: C, 77.76; H, 7.53.

EXAMPLE 3

*16α,17α-Chloral Derivative of 19-Nor-1,3,5(10)-Pregnatriene-3,16α,17α-Triol-20-One*

Following the procedure of Example 1 but substituting an equivalent amount of the 16α,17α-chloral derivative of $\Delta^{1,4}$-pregnadiene-16α,17α-diol-3,20-dione for the acetonide, the 16α,17α-chloral derivative of 19-nor-1,3,5(10)-pregnatriene-3,16α,17α-triol-20-one is obtained.

EXAMPLE 4

*16α,17α-Dicyclopropyl Ketone Derivative of 19-Nor-1,3,5(10)-Pregnatriene-3,16α,17α-Triol-20-One*

Following the procedure of Example 1 but substituting an equivalent amount of the 16α,17α-dicyclopropyl ketone derivative of $\Delta^{1,4}$-pregnadiene-16α,17α-diol-3,20-dione for the acetonide, the 16α,17α-dicyclopropyl ketone derivative of 19-nor-1,3,5(10) - pregnatriene - 3,16α,17α-triol-20-one is obtained.

Similarly, the methylisobutyl ketone derivative, the cyclopropyl phenyl ketone derivative, the cyclohexyl methyl ketone derivative, the 1,1,1-trifluoroacetonide derivative, the heptafluorobutanol derivative, the p-chloroacetophenone derivative, the p-nitroacetophenone derivative, the benzaldehyde derivative, the furfural derivative, the benzophenone derivative and the 2-acetylfuran derivative of $\Delta^{1,4}$-pregnadiene-16α,17α-3,20-dione, yield the methylisobutyl ketone, the cyclopropyl phenyl ketone, the cyclohexyl methyl ketone, the 1,1,1-trifluoroacetonide, the heptafluorobutanol, the p-chloroacetophenone, the p-nitroacetophenone, the benzaldehyde, the furfural, the benzophenone and the 2-acetylfuran derivatives of 19-nor-1,3,5(10)-pregnatriene-3,16α,17α-triol-20-one.

EXAMPLE 5

*6α-Methyl-19-Nor-1,3,5(10)-Pregnatriene-3,16α,17α-Triol-20-One 16α,17α-Acetonide*

Following the procedure of Example 1 but substituting an equivalent amount of 6α-methyl-1-dehydro-16α,17α-dihydroxyprogesterone 16α,17α-acetonide for the $\Delta^1$-16α,17α-dihydroprogesterone 16α,17α-acetonide, 6α-methyl-19-nor-1,3,5(10) - pregnatriene - 3,16α,17α-triol-20-one 16α,17α-acetonide is obtained.

EXAMPLE 6

*6β-Methyl-19-Nor-1,3,5(10)-Pregnatriene-3,16α,17α-Triol-20-One 16α-17α-Acetonide*

Following the procedure of Example 1 but substituting an equivalent amount of 6β-methyl-1-dehydro-16α,17α-dihydroxyprogesterone 16α,17α-acetonide for the $\Delta^1$-16α,17α-dihydroxyprogesterone 16α,17α-acetonide, 6β-methyl-19-nor - 1,3,5(10) - pregnatriene - 3,16α,17α - triol-20-one 16α,17α-acetonide is obtained.

EXAMPLE 7

*6α-Methyl-19-Nor-1,3,5(10)-Pregnatriene-3,16α,17α-Triol-20-One 16α,17α-Acetophenonide*

Following the procedure of Example 1 but substituting an equivalent amount of 6α-methyl-$\Delta^{1,4}$-pregnadiene-16α,17α-diol-3,20-dione 16α,17α-acetophenonide for the $\Delta^1$-15α,17α-dihydroxyprogesterone 16α,17α-acetonide, 6α-methyl-19-nor-1,3,5(10) - pregnatriene-3,16α,17α-triol-20-one 16α,17α-acetophenonide is obtained.

EXAMPLE 8

*19-Nor-3-Methoxy-1,3,5(10)-Pregnatriene-16α,17α-Diol-20-One 16α,17α-Acetonide*

A refluxing solution of 130 mg. of 19-nor-1,3,5(10)-pregnatriene-3,16α,17α-triol-20-one 16α,17α-acetonide in 10 ml. of ethanol is treated four times, alternatively, with 0.45 ml. of 40% potassium hydroxide solution and 0.35 ml. of dimethyl sulfate. After ten minutes the mixture is cooled, diluted with water and the product collected and recrystallized from acetone-hexane to give about 120 mg. of fine needles, M.P. about 179–180°. Further recrystallizations from acetone-hexane yields the analytically pure sample of the methyl ether having the following properties: M.P. about 183–185°; $[\alpha]_D^{23}$ +88° (c., 1.0 in chlf.);

$\lambda_{max}^{Nujol}$ 5.83, 6.19 and 6.34μ; $\lambda_{max}^{alc.}$ 278 mμ (ε=2400), 287 mμ (ε=2250)

*Analysis.*—Calcd. for $C_{24}H_{32}O_4$ (384); C, 74.97; H, 8.39; OCH$_3$, 8.07. Found: C, 74.90; H, 8.22; OCH$_3$, 7.89.

EXAMPLE 9

*19-Nor-3-Methoxy-1,3,5(10)-Pregnatriene-16α,17α-20-One 16α,17α-Acetophenonide*

A solution of 52 mg. of the 16α,17α-acetophenone derivative of 19-nor-1,3,5(10)-pregnatriene-3,16α,17α-triol-3-one in 4 ml. of ethanol is treated with alkali and dimethyl sulfate as described in Example 8. Crystallization of the crude product from methanol yields about 40 mg. of the acetophenone derivative of 19-nor-3-methoxy-1,3,5(10)-pregnatriene-16α,17α-diol-20-one, M.P. about 142–145°, which on recrystallization from chloroform-methanol furnishes analytically pure compound of the following properties: M.P. about 147–149°; $[\alpha]_D^{23}$ +41° (c., 1.0 in chlf.);

$\lambda_{max}^{Nujol}$ 5.82, 619, 6.30, 12.92 and 14.15μ; $\lambda_{max}^{alc.}$ 278 mμ (ε =2150), 287 mμ (ε=1950), minimum at 246 mμ

*Analysis.*—Calcd. for $C_{29}H_{34}O_4$ (446); C, 77.99; H, 7.67; OCH$_3$, 6.94. Found: C, 78.14; H, 7.72; OCH$_3$, 7.02.

EXAMPLE 10

*16α,17α-Chloral Derivative of 19-Nor-3-Methoxy-1,3,5(10)-Pregnatriene-16α,17α-Diol-20-One*

Following the procedure of Example 8 but substituting an equivalent amount of 16α,17α-chloral derivative of 19-nor-1,3,5(10)-pregnatriene-3,16α,17α-triol-20-one for the acetonide, 16α,17α-chloral derivative of 19-nor-3-methoxy-1,3,5(10) - pregnatriene - 16α,17α-diol-20-one is obtained.

EXAMPLE 11

*16α,17α-Dicyclopropyl Ketone Derivative of 19-Nor-3-Methoxy-1,3,5(10)-Pregnatriene-16α,17α-Diol-20-One*

Following the procedure of Example 8 but substituting an equivalent amount of 16α,17α-dicyclopropyl ketone derivative of 19-nor-1,3,5(10)-pregnatriene-3,16α, 17α-triol-20-one for the acetonide, the 16α,17α-dicyclopropyl ketone derivative of 19-nor-3-methoxy-1,3,5(10)-pregnatriene-16α-17α-diol-20-one is obtained.

Similarly, the methylisobutyl ketone derivative, the cyclopropyl phenyl ketone derivative, the cyclohexyl methyl ketone derivative, the 1,1,1-trifluoroacetonide derivative, the heptafluorobutanal derivative, the p-chloroacetophenone derivative, the p-nitroacetophenone derivative, the benzaldehyde derivative, the furfural derivative, the benzophenone derivative and the 2-acetylfuran derivative of 19-nor - 1,3,5(10) - pregnatriene-3,16α,17α-triol-20-one, yield the methylisobutyl ketone, the cyclopropyl phenyl ketone, the cyclohexyl methyl ketone, the 1,1,1-trifluoroacetonide, the heptafluorobutanal, the p-chloroacetophenone, the p-nitroacetophenone, the benzaldehyde, the furfural, the benzophenone and the 2-acetylfuran derivatives of 19-nor-3-methoxy-1,3,5(10)-pregnatriene-16α,17α-diol-20-one.

EXAMPLE 12

*6α-Methyl-19-Nor-3-Methoxy-1,3,5(10)-Pregnatriene-16α,17α-Diol-20-One 16α,17α-Acetonide*

Following the procedure of Example 8 but substituting an equivalent amount of 6α-methyl-19-nor-1,3,5(10)-pregnatriene - 3,16α,17α-triol - 20 - one 16α,17α-acetonide for the acetonide, 6α-methyl-19-nor-3-methoxy-1,3,5(10)-pregnatriene-16α,17α-diol-20-one 16α,17α-acetonide is obtained.

EXAMPLE 13

*6β-Methyl-19-Nor-3-Methoxy-1,3,5(10)-Pregnatriene-16α,17α-Diol-20-One 16α,17α-Acetonide*

Following the procedure of Example 8 but substituting an equivalent amount of 6β-methyl-19-nor-1,3,5(10)-pregnatriene-3,16α,17α-triol-20-one 16α,17α-acetonide for the acetonide, 6β-methyl-19-nor-3-methoxy-1,3,5(10)-pregnatriene 16α,17α-diol-20-one 16α,17α-acetonide is obtained.

EXAMPLE 14

*6α-Methyl-19-Nor-3-Methoxy-1,3,5(10)-Pregnatriene-16α,17α-Diol-20-One 16α,17α-Acetophenonide*

Following the procedure of Example 8 but substituting an equivalent amount of 6β-methyl-19-nor-1,3,5(10)-pregnatriene-3,16α,17α-triol-20-one 16α,17α-acetophenonide for the acetonide, 6α-methyl-19-nor-3-methoxy-1,3,5(10)-pregnatriene-16α,17α-diol-20-one 16α,17α - acetophenonide is obtained.

EXAMPLE 15

*19-Nor-3-Methoxy-1,3,5(10)-Pregnatriene-16α,17α,20β-Triol 16α,17α-Acetonide*

A solution of 280 mg. of 19-nor-3-methoxy-1,3,5(10)-pregnatriene-16α,17α-diol-20-one 16α,17α-acetonide and 340 mg. of lithium aluminum hydride in 50 ml. of anhydrous ether is refluxed for 2 hours and then stirred at room temperature for 18 hours. Saturated sodium sulfate solution is added carefully until a precipitate forms. The ether is decanted and the precipitate washed four times with 20 ml. portions of ether. After removal of the solvent the crude residue (about 277 mg.) is crystallized from acetone-hexane yielding about 225 mg. of product. The 20β-hydroxy compound is obtained in two polymorphic modifications, which melt respectively at about 108–110° and about 149–151°. The analytically pure sample has the following properties: M.P. about 149–151° C.; $[\alpha]_D^{23}+49°$ (c., 0.9 in chlf.);

$\lambda_{max.}^{Nujol}$ 2.60, 2.65, 6.18 and 6.32μ; $\lambda_{max.}^{alc.}$ 277 mμ (ε=2040), 287 mμ (ε=1910)

*Analysis.*—Calcd. for $C_{24}H_{34}O_4$ (386): C, 74.57; H, 8.87. Found: C, 74.45; H, 8.52.

EXAMPLE 16

To a solution of 30 mg. of 19-nor-3-methoxy-1,3,5(10)-pregnatriene-16α,17α-diol-20 - one 16α,17α - acetonide in 10 ml. of isopropyl alcohol is added 100 mg. of sodium borohydride. The resulting mixture is refluxed for 18 hours, cooled and the excess borohydride decomposed by the addition of water. After concentration in vacuo and dilution with distilled water the reduction product precipitates. It is removed by filtration, the precipitate washed with water and recrystallized from acetone-hexane.

EXAMPLE 17

*19-Nor-3-Methoxy-1,3,5(10)-Pregnatriene-16α,17α,20β-Triol 16α,17α-Acetophenonide*

To a solution of 33 mg. of the 16α,17α-acetophenone derivative of 3-methoxy-19-nor-1,3,5(10)-pregnatriene-16α,17α-diol-20-one in 15 ml. of tetrahydrofuran is added 100 mg. of lithium borohydride. The mixture is refluxed for 8 hours, cooled and excess borohydride decomposed by the addition of water. After the evaporation of the organic solvent the aqueous solution is extracted with chloroform and the resulting chloroform extract washed with saturated sodium chloride solution, dried over sodium sulfate and evaporated to dryness in vacuo. The product, about 40 mg., cannot be induced to crystallize even after column chromatography.

$\lambda_{max.}^{CS_2}$ 2.80, 5.79 (very weak); 13.05 and 14.20μ

EXAMPLE 18

*16α,17α-Chloral Derivative of 19-Nor-3-Methoxy-1,3,5(10)-Pregnatriene-16α,17α,20-Triol*

Following the procedure of either Example 15 or Example 16, but substituting an equivalent amount of the 16α,17α-chloral derivative of 19-nor-3-methoxy-1,3,5(10)-pregnatriene-16α,17α-diol-20-one for the acetonide, the 16α,17α-chloral derivative of 19-nor-3-methoxy-1,3,5(10)-pregnatriene-16α,17α,20β-triol is obtained.

EXAMPLE 19

*16α,17α-Dicyclopropyl Ketone Derivative of 19-Nor-3-Methoxy-1,3,5(10)-Pregnatriene-16α,17α-Triol*

Following the procedure of either Example 15 or Example 16, but substituting an equivalent amount of the 16α,17α-dicyclopropyl ketone derivative of 19-nor-3-methoxy-1,3,5(10)-pregnatriene-16α,17α-diol-20-one for the acetonide, the 16α,17α-dicyclopropyl ketone derivative of 19-nor-3-methoxy-1,3,5(10)-pregnatriene-16α,17α,20β-triol is obtained.

Similarly, the methylisobutyl ketone derivative, the cyclopropyl phenyl ketone derivative, the cyclohexyl methyl ketone derivative, the 1,1,1-trofluoroacetonide derivative, the heptafluorobutanal derivative, the p-chloroacetophenone derivative, the p-nitroacetophenone derivative, the benzaldehyde derivative, the furfural derivative, the benzophenone derivative and the 2-acetylfuran derivative of 19-nor-3-methoxy-1,3,5(10)-pregnatriene-16α,17α-diol-20-one, yield the respective 16α, 17α-cyclic ketal derivatives of 19-nor-3-methoxy-1,3,5(10)-pregnatriene-16α,17α,20β-triol.

EXAMPLE 20

*6α-Methyl-19-Nor-3-Methoxy-1,3,5(10)-Pregnatriene-16α,17α,20β-Triol 16α,17α-Acetonide*

Following the procedure of either Example 15 or Example 16, but substituting 6α-methyl-19-nor-3-methoxy-1,3,5(10)-pregnatriene-16α,17α-diol-20-one 16α,17α-acetonide for the acetonide, 6α-methyl-19-nor-3-methoxy-1,3, 5(10)-pregnatriene-16α,17α,20β-triol-16α,17α - acetonide is obtained.

EXAMPLE 21

*6β-Methyl-19-Nor-3-Methoxy-1,3,5(10)-Pregnatriene-16α,17α,20β-Triol 16α,17α-Acetonide*

Following the procedure of either Example 15 or Example 16, but substituting 6β-methyl-19-nor-3-methoxy-1,3,5(10)-pregnatriene-16α,17α-diol-20-one 16α,17α-acetonide for the acetonide, 6β-methyl-19-nor-3-methoxy-1,3,5(10)-pregnatriene-16α,17α,20β-triol 16α,17α-acetonide is obtained.

EXAMPLE 22

*6α-Methyl-19-Nor-3-Methoxy-1,3,5(10)-Pregnatriene-16α,17α, 20β-Triol 16α,17α-Acetophenonide*

Following the procedure of either Example 15 or Example 16, but substituting 6α-methyl-19-nor-3-methoxy-1,3,5(10)-pregnatriene-16α,17α-diol-20-one 16α,17α acetophenonide for the acetonide, 6α-methyl-19-nor-3-methoxy-1,3,5(10)-pregnatriene-16α,17α,20β-triol 16α,17α-acetophenonide is obtained.

EXAMPLE 23

*19-Nor-3-Methoxy-1,3,5(10)-Pregnatriene-16α,17α,20β-Triol 16α,17α-Acetonide 20β-Acetate*

A solution of 25 mg. of 19-nor-3-methoxy-1,3,5(10)-pregnatriene-16α,17α,20β-triol 16α,17α-acetonide in 0.5 ml. of acetic anhydride and 0.5 ml. of pyridine is permitted to remain at room temperature for 18 hours. The reagents are then evaporated in vacuo and the residue crystallized from acetone-hexane. The pure acetate has the following properties: MP. about 158–160°;

$[\alpha]_D^{23} + 66°$ $\lambda_{max.}^{Nujol}$ 5.73, 6.20, 6.31, 7.98 and 8.08μ

EXAMPLE 24

*19-Nor-3-Methoxy-1,3,5(10)-Pregnatriene-16α,17α,20β-Triol 16α,17α-Acetonide 20β-Propionate*

Following the procedure of Example 23 but substituting an equivalent amount of propionic anhydride for the acetic anhydride, the 20β-propionic acid ester is obtained.

Similarly, by substituting other acylating agents, such as benzoyl chloride, for acetic anhydride in Example 23 the corresponding esters are obtained. Moreover, any of the other steroids of this invention can be substituted for the steroid reactant in the procedure of Example 23 to yield the corresponding 20β-acetate derivatives.

EXAMPLE 25

*19-Nor-1,3,5,(10)-Pregnatriene-3,16α17α-Triol-20-One*

A solution of 830 mg. of 19-nor-1,3,5(10)-pregnatriene-3,16α,17α-triol-20-one 16α,17α-acetonide in 25 ml. of 88% formic acid is allowed to remain at 42° for 22 hours. At the end of that period the formic acid is removed completely in vacuo and the residue is dissolved in 83 ml. of oxygen-free methanol. To this solution is added under nitrogen 16.6 ml. of an oxygen-free 10% potassium carbonate solution and the mixture is allowed to remain at room temperature under nitrogen for 30 minutes. 1.7 ml. of glacial acetic acid is then added, followed by 100 ml. of water. Upon removal of the bulk of the methanol in vacuo crystallization of the resulting 19-nor-1,3,5(10)-pregnatriene-3,16α,17α-triol-20-one ensues. The crystalline precipitate is filtered, dried and recrystallized from acetone-hexane.

EXAMPLE 26

*6α-Methyl-19-Nor-1,3,5(10)-Pregnatriene-3,16α,17α-Triol-20-One*

Following the procedure of Example 25 but substituting an equivalent amount of 6α-methyl-19-nor-1,3,5(10)-pregnatriene-3,16α,17α-triol-20-one 16α,17α-acetonide for the acetonide, 6α-methyl-19-nor-1,3,5(10)-pregnatriene-3,16α,17α-triol-20-one is obtained.

EXAMPLE 27

*6β-Methyl-19-Nor-1,3,5(10)-Pregnatriene-3,16α,17α-Triol-20-One*

Following the procedure of Example 25 but substituting an equivalent amount og 6β-methyl-19-nor-1,3,5(10)-pregnatriene-3,16α,17α-triol-20-one 16α17α-acetonide for the acetonide, 6β-methyl-19-nor-1,3,5(10)-pregnatriene-3,16α17α-triol-20-one is obtained.

EXAMPLE 28

*19-Nor-3-Methoxy-1,3,5(10)-Pregnatriene-16α,17α-Diol-20-One*

Following the procedure of Example 25 but substituting an equivalent amount of 19-nor-3-methoxy-1,3,5(10)-pregnatriene-16α,17α-diol-20-one 16α,17α-acetonide for the acetonide, 19-nor-3-methoxy-1,3,5(10)-pregnatriene-16α,17α-diol-20-one is obtained.

EXAMPLE 29

*6α-Methyl-19-Nor-3-Methoxy-1,3,5(10)-Pregnatriene-16α,17α-Diol-20-One*

Following the procedure of Example 25 but substituting an equivalent amount of 6α-methyl-19-nor-3-methoxy1,3,5(10)-pregnatriene-16α,17α-diol-20-one 16α,17α-acetonide, for acetonide, 6α-methyl-19-nor-3-methoxy-1,3,5(10)-pregnatriene-16α,17α-diol-20-one is obtained.

EXAMPLE 30

*6β-Methyl-19-Nor-3-Methoxy-1,3,5(10)-Pregnatriene-16α,17α-Diol-20-One*

Following the procedure of Example 25 but substituting an equivalent amount of 6β-methyl-19-nor-3-methoxy-1,3,5(10)-pregnatriene-16α,17α-diol-20-one 16α,17α-acetonide for the acetonide, 6β-methyl-19-nor-3-methoxy-1,3,5(10)-pregnatriene-16α,17α-diol-20-one is obtained.

EXAMPLE 31

*Acetophenone Derivative of 19-Nor-1,3,5(10)-Pregnatriene-3,16α,17α-Triol-20-One*

A suspension of 100 mg. of 19-nor-1,3,5(10)-pregnatriene-3,16α,17α-triol-20-one in 5 ml. of redistilled acetophenone and 0.025 ml. of 70% perchloric acid is stirred at room temperature for 1½ hours. The resulting solution is neutralized with sodium bicarbonate solution and after the addition of chloroform, the layers are separated and the organic phase washed with water. Removal of the chloroform and acetophenone in high vacuum leaves a residue, which on recrystallization from acetone-hexane gives the pure acetophenone derivative of 19-nor-1,3,5(10)-pregnatriene-3,16α,17α-triol-20-one.

EXAMPLE 32

*Benzaldehyde Derivatives of 19-Nor-1,3,5(10)-Pregnatriene-3,16α,17α-Triol-20-One*

Following the procedure of Example 31 but substituting an equivalent amount of benzaldehyde for the acetophenone, the two isomeric benzaldehyde derivatives of 19 - nor - 1,3,5(10)-pregnatriene-3,16α,17α-triol-20-one are obtained, and are separated by chromatographic separation on alumina.

EXAMPLE 33

*Furfural Derivatives of 19-Nor-1,3,5(10)-Pregnatriene-3,16α,17α-Triol-20-One*

Following the procedure of Example 31 but substituting an equivalent amount of furfural for the acetophenone, the two isomeric furfural derivatives of 19-nor-1,3,5(10)-pregnatriene-3,16α,17α-triol-20-one are obtained, and are separated by chromatographic separation on alumina.

EXAMPLE 34

*Thiophene-2-Carboxaldehyde Derivatives of 19-Nor-1,3,5(10)-Pregnatriene-3,16α,17α-Triol-20-One*

Following the procedure of Example 31 but substituting an equivalent amount of thiophene-2-carboxaldehyde for the acetophenone, the two isomeric thiophene-2-carboxaldehyde derivatives of 19-nor-1,3,5(10)-pregnatriene-3,16α,17α-triol-20-one are obtained, and are separated by chromatographic separation on alumina.

EXAMPLE 35

2-Acetylfuran Derivative of 19-Nor-1,3,5(10)Pregnatriene-3,16α,17α-Triol-20-One Following the procedure of Example 31 but substituting an equivalent amount of 2-acetylfuran for the acetophenone, the 2-acetylfuran derivative of 19-nor-1,3,5(10)-pregnatriene-3,16α,17α-triol-20-one is obtained.

EXAMPLE 36

2-Acetylthiophene Derivative of 19-Nor-1,3,5(10)-Pregnatriene-3,16α,17α-Triol-20-One Following the procedure of Example 31 but substituting an equivalent amount of 2-acetylthiophene for the acetophenone, the 2-acetylthiophene derivative of 19-nor-1,3,5(10)-pregnatriene-3,16α,17α-triol-20-one is obtained.

Similarly, by substituting any other aldehyde or ketone for the acetophenone in the procedure of Example 31, all other acetals and ketals of this invention can be prepared.

EXAMPLE 37

Acetophenone Derivative of 6α-Methyl-19-Nor-1,3,5(10)-Pregnatriene-3,16α,17α-Triol-20-One Following the procedure of Example 31 but substituting an equivalent amount of 9α-methyl-19-nor-1,3,5(10)-pregnatriene - 3,16α,17α - triol-20-one for the 19-nor-1,3,5(10)-pregnatriene-3,16α,17α-triol-20-one, the acetophenone derivative of 6α - methyl - 19-nor-1,3,5(10)-pregnatriene-3,16α,17α-triol-20-one is obtained.

EXAMPLE 38

Acetophenone Derivative of 6β-Methyl-19-Nor-1,3,5(10)-Pregnatriene-3,16α,17α-Triol-20-One Following the procedure of Example 31 but substituting an equivalent amount of 6β-methyl-19-nor-1,3,5(10)-pregnatriene-3,16α,17α - triol - 20-one for the 19-nor-1,3,5(10)-pregnatriene-3,16α,17α-triol-20-one, the acetophenone derivative of 6β-methyl-19-nor-1,3,5(10)-pregnatriene-3,16α,17α-triol-20-one is obtained.

EXAMPLE 39

Acetophenone Derivative of 19-Nor-3-Methoxy-1,3,5(10)-Pregnatriene-16α,17α-Diol-20-One Following the procedure of Example 31 but substituting an equivalent amount of 19-nor-3-methoxy-1,3,5(10)-pregnatriene - 16α,17α - diol - 20-one for the 19-nor-1,3,5(10)-pregnatriene-3,16α,17α-triol-20-one, the acetophenone derivative of 19 - nor - 3-methoxy-1,3,5(10)-pregnatriene-16α,17α-diol-20-one is obtained.

EXAMPLE 40

Acetophenone Derivative of 6α-Methyl-19-Nor-3-Methoxy-1,3,5(10)-Pregnatriene-16α,17α-Diol-20-One Following the procedure of Example 31 but substituting an equivalent amount of 6α-methyl-19-nor-3-methoxy-1,3,5(10)-pregnatriene-16α,17α-diol-20-one for the 19-nor-1,3,5(10)-pregnatriene-3,16α,17α-triol - 20 - one, the acetophenone derivative of 6α-methyl-19-nor-3-methoxy-1,3,5(10)-pregnatriene-16α,17α-diol-20-one is obtained.

EXAMPLE 41

Acetophenone Derivatives of 6β-Methyl-19-Nor-3-Methoxy-1,3,5(10)-Pregnatriene-16α,17α-Diol-20-One Following the procedure of Example 31 but substituting an equivalent amount of 6β-methyl-19-nor-3-methoxy-1,3,5(10)-pregnatriene-16α,17α-diol-20-one for the 19-nor-1,3,5(10)-pregnatriene-3,16α,17α-triol - 20 - one, the acetophenone derivative of 6β-methyl-19-nor-3-methoxy-1,3,5(10)-pregnatriene-16α,17α-diol-20-one is obtained.

This invention may be variously otherwise embodied within the scope of the appended claims.

What is claimed is:
1. A compound of the formula

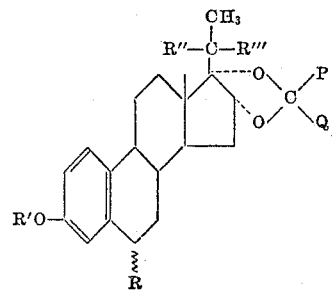

wherein R is selected from the group consisting of hydrogen and lower alkyl; R' is selected from the group consisting of hydrogen and lower alkyl; R" is selected from the group consisting of β-hydroxy and β-acyloxy wherein the acyl radical is from a hydrocarbon carboxylic acid of less than ten carbon atoms; R''' is hydrogen, and together R" and R''' is oxo; P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocylic lower alkyl; and together with the carbon to which they are joined P and Q is selected from the group consisting of monocyclic cycloalkyl and monocyclic heterocyclic.

2. 19 - nor - 1,3,5(10)-pregnatriene-3,16α,17α-triol-20-one 16α,17α-acetonide.

3. 6-(lower alkyl) - 19 - nor - 1,3,5(10)-pregnatriene-3,16α,17α-triol-20-one 16α,17α-acetonide.

4. 6 - methyl - 19 - nor-1,3,5(10)-pregnatriene-3,16α,17α-triol-20-one 16α,17α-acetonide.

5. 19 - nor - 3(lower alkoxy) - 1,3,5(10)pregnatriene-16α,17α-diol-20-one 16α,17α-acetonide.

6. 19 - nor - 3 - methoxy-1,3,5(10)-pregnatriene-16α,17α-diol-20-one 16α,17α-acetonide.

7. 19 - nor - 3-(lower alkoxy)-1,3,5(10)-pregnatriene-16α,17α,20β-triol-16α,17α-acetonide.

8. 19 - nor - 3 - methoxy-1,3,5(10)-pregnatriene-16α,17α,20β-triol 16α,17α-acetonide.

9. 19 - nor - 3 - (lower alkoxy)-1,3,5(10)-pregnatriene-16α,17α,20β-triol 16α,17α-acetonide 20β-(lower alkanoate).

10. 19 - nor - 3 - methoxy-1,3,5(10)-pregnatriene-16α, 17α,20β-triol 16α,17α-acetonide 20β-acetate.

11. A compound of the formula

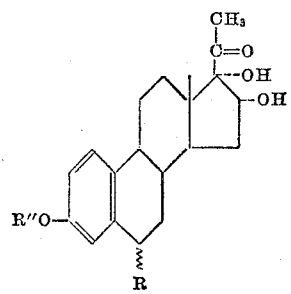

wherein R is selected from the group consisting of hydrogen and lower alkyl, and R" is selected from the group consisting of hydrogen and lower alkyl.

12. 19 - nor - 1,3,5(10) - pregnatriene - 3,16α,17α-triol-20-one.

13. 19-nor-3-methoxy-1,3,5(10)-pregnatriene-16α,17α-diol-20-one.

References Cited in the file of this patent

UNITED STATES PATENTS

| | | |
|---|---|---|
| 2,280,828 | Inhoffen | Apr. 28, 1942 |
| 2,753,342 | Djerassi et al. | July 3, 1956 |
| 3,200,968 | Bernstein et al. | Oct. 3, 1961 |

FOREIGN PATENTS

| | | |
|---|---|---|
| 854,343 | Great Britain | Nov. 16, 1960 |

OTHER REFERENCES

Loewenthal: Tetrahedron, 1959, vol. 6, pp. 281 and 282.